United States Patent Office 3,238,225
Patented Mar. 1, 1966

3,238,225
CATALYTIC OXIDATION OF DIOLEFINS TO FURAN
William F. Brill, Skillman, and Alfio J. Besozzi, East Brunswick, N.J., assignors to Petro-Tex Chemical Corporation, Houston, Tex., a corporation of Delaware
No Drawing. Filed Nov. 1, 1963, Ser. No. 320,825
3 Claims. (Cl. 260—346.1)

This invention relates to a process for the production of furan compounds and relates more particularly to a high temperature catalytic process for producing furan compounds from diolefins.

We have found quite unexpectedly that highly selective yields of furan can be obtained by the direct oxidation of diolefins over a particular and specific type of catalyst without decomposition and resinification of the furan. Furan is sensitive to oxygen with ring cleavage occurring easily under oxidation conditions which may result in charring and uncontrolled polymerization with the formation of tars. For this reason the combination of oxygen and furan is generally avoided. There have also been reports suggesting that furan peroxidic products might form under normal oxidation conditions. Such peroxidic products are easily resinified when exposed to oxygen or air and particularly at temperatures between 400° C. and 700° C. Because of possible ring decomposition, formation of peroxide products and resin formation, the direct oxidation of diolefins to produce furan has been for the most part unexplored. In accordance with this invention, a highly selective oxidation of diolefins is accomplished by oxidizing a diolefin over a molybdenum-bismuth type catalyst under specific reaction conditions to form furan without ring cleavage and formation of peroxidic compounds and resins.

The diolefins employed in the process of this invention contain at least four carbon atoms and include such conjugated diolefins as butadiene and isoprene. Butadiene is generally preferred because of its availability and cost.

Amounts of oxygen employed may be between about 0.1 to 5 mols of oxygen per mol of diolefin. Mol ratios between 0.5 to 2.0 are satisfactory. The oxygen and diolefin may be added to a reactor as a mixture or the oxygen may be introduced into the reaction zone separate from the diolefin. Preferably, the reactants are individually preheated and separately introduced in a mixing zone where the reactants are combined just prior to contacting the catalyst.

The reaction zone temperature is maintained at a temperature above 400° C. Temperatures between 400° C. and 700° C. and preferably temperatures of 450° C. to 600° C. are suitably employed. A reaction zone preheat temperature maintained between about 200° C. and 400° C. may also be used to good advantage.

The catalyst utilized in this invention consists essentially of mixtures of bismuth and molybdenum oxides with molybdenum being the major component. To prepare furan from butadiene, atomic ratios of molybdenum to bismuth of between 15 atoms to one atom of molybdenum per atom of bismuth are used. Atomic ratios of molybdenum to bismuth of 10 atoms to 3 atoms of molybdenum per atom of bismuth are preferred.

The catalysts are readily prepared by methods known to those skilled in the art. For example, the catalyst actives may be deposited on catalyst supports from an aqueous slurry of the oxides, or the support may be impregnated with salts in solution and then dried and heated in the presence of oxygen at elevated temperatures. Fluidized catalyst systems are advantageously used with this invention and good results obtained, for example, with catalyst actives consisting essentially of the oxides of molybdenum and bismuth deposited on crushed Alundum pellets. The fluid bed catalysts may be prepared by mixing solutions of the catalyst actives in the presence of fluid supports such as alpha alumina. These catalyst particles for a fluid bed process normally are less than 100 mesh and greater than 40 mesh standard screen size. The catalyst supports preferably have large pores. The percent porosity should be between 15 and 60 percent. The surface area of the catalyst particles should be less than 25 square meters per gram and preferably is between about 1 and 10 square meters per gram.

In addition to a fluidized bed reactor, a variety of reactors may be used in the practice of this invention. Generally, any reactor which may be operated without creating excessive flow restrictions and back pressure may be used. Large diameter tubular reactors which can be easily charged and emptied of catalyst particles are useful. The catalyst particles may vary in size, being limited however by the preferred surface area and flow rates through the reactor.

An essential feature of this invention is in maintaining the pressure of the diolefin at a pressure equivalent to less than one-half atmosphere, although the total system pressure employed in the practice of this invention may be greater or less than one atmosphere, and preferably at or about 50 to 150 p.s.i.g. Good yields of furan are obtained from butadiene with the partial pressure of the butadiene being kept equivalent to below 250 mm. of mercury absolute when the total system pressure is one atmosphere. Partial pressures of butadiene equivalent to about 15 mm. of mercury absolute to about 200 mm. of mercury absolute when the total system pressure is one atmosphere are preferred. It has been found to be particularly advantageous to maintain the desired partial pressure with inert diluents. If desired, a combination of inert diluents and a vacuum may be used. Materials which are substantially inactive when in contact with the other reactants or reaction products may be used as a diluent. Examples of suitable inert diluents that may be used include helium, nitrogen, methane, carbon dioxide, and the like. Steam is a particularly advantageous additive and is much preferred. At reaction temperatures above 500° C. it is preferred that at least one-half of the inert diluent consists of steam. When the volume of steam is greater than one-half of the total inert gas volume at reaction temperatures above 500° C., butadiene selectivities to furan are improved. When the inert diluent is composed of at least 50 percent steam, the mol ratios of total inert diluent to butadiene may be varied from about 2 to 30 mols of inert diluent per mol of butadiene.

As stated, the pressure of butadiene should be equivalent to less than 250 mm. of mercury absolute when the total system pressure is one atmosphere. For example, a mixture of one mol of butadiene, 2 mols of oxygen and 7 mols of steam under a total system pressure of one atmosphere would have an absolute partial pressure of butadiene of about one-tenth of the total pressure or approximately 76 mm. of mercury absolute. This partial pressure of 76 mm. of mercury absolute is equivalent to a total system vacuum of 76 mm. of mercury absolute. When the total system pressure is 2 atmospheres and the same mixture of 1 mol of butadiene and 2 mols of oxygen and 7 mols of steam is used, the equivalent partial pressure of butadiene of 152 mm. of mercury would be equivalent to 76 mm. of mercury absolute at an adjusted one atmosphere total system pressure. Thus, when the total pressure in the reaction zone is greater than one atmosphere, the absolute values for the presssure of butadiene is increased in direct proportion to the increase in total pressure above one atmosphere. Optimum yields of furan may be obtained by the direct oxidation of butadiene when the butadiene is maintained at a pressure of less than 250 mm. of mercury absolute and preferably when at least one-half of this desired partial pressure is obtained by the use of a steam diluent. In contrast with the teachings of the prior art, good yields of furan are then obtained with little decomposition and no resinification of the furan products through use of these necessary reaction conditions.

Contact times required in the operation of this invention may be varied over a wide range. Contact times as low as 0.001 second to 10 seconds may be used. Contact times between 0.1 and 3 seconds are satisfactory. Higher contact times normally are required when lower oxidation reaction temperatures are employed and shorter retention times are used as the reaction temperature is increased.

In the following examples, furan yield refers to the mols of furan produced based on the butadiene consumed.

*Example 1*

The runs in this example were made in a fixed bed tubular reactor of Vycor having an outside diameter of 30 mm. and being 24 inches in length. Heat was supplied by a dual heavy duty electric furnace wired so that both the upper and lower portions of the reactor could be separately heated. Each portion of the electric furnace was separately controlled by a voltage regulator. Thermocouples were inserted in a thermowell located in the center of the Vycor reactor for purposes of recording and controlling the heat to the reaction zone. The uppermost portion of the reactor was used as a preheat section for the reaction zone which was located directly below the preheat section. The reactants were metered through rotameters into a manifold in the top of the reactor. The reactants were preheated in the preheat section of the reactor prior to introduction into the reaction zone. The effluent gases were periodically sampled through a sampling port just below the heated section of the reactor and analyzed on a temperature programmed chromatograph.

A catalyst was prepared by dissolving 13.01 grams of $Bi(NO_3)_3 \cdot 5H_2O$ in 40 mls. of water and 10 mls. of nitric acid. 22.99 grams of $(NH_4)_6Mo_7O_{24} \cdot 4H_2O$ was dissolved in 50 mls. of water and this solution was mixed with the bismuth nitrate solution. 25 mls. of concentrated nitric acid was then added to this mixture to redissolve the precipitate. 25 grams of Alundum pellets ⅛″ x ⅛″ were stirred into this solution which was evaporated to dryness in a rotating flask evaporated under vacuum at 65 to 70° C. The catalyst was then heated at 300° C. under oxygen for 60 hours. This catalyst contained the equivalent of 10 weight percent coated on the support of a mixture of 25 parts of $Bi_2O_3$ and 75 parts of $MoO_3$. 183 mls. of the catalyst was placed in the reactor tube. Directly above the catalyst bed, Alundum pellets were added to serve as a preheat zone. The reactor was heated to a temperature of 500° C. The preheat zone temperature was about 250° C. A reaction mixture consisting of 5 mol percent butadiene, 10 mol percent oxygen and 85 percent steam was then passed through the reactor. The steam was obtained from water which was vaporized and heated along with the butadiene and oxygen in the preheat portion of the reactor. A contact time of about two seconds at a butadiene pressure equivalent to 45 mm. of mercury absolute was maintained. The butadiene was converted to furan at a conversion of 20.4 percent and a selectivity of 49.4 percent. The porosity of the carrier particles was greater than 15 percent and less than about 50 percent, and the surface area of the catalyst particles was between one and five square meters per gram. When a run was made under the conditions similar to those set forth above with a catalyst having a surface area of between 60 and 70 square meters per gram, no furan was obtained and the butadiene was converted almost completely to carbon monoxide and carbon dioxide. When the example was repeated with the butadiene pressure maintained at 350 mm. of mercury absolute, very low yields of furan and large quantities of CO and $CO_2$ were obtained. When the example was repeated and the steam replaced with nitrogen, lower yields of furan were obtained.

*Example 2*

A fluid bed reactor was set up with a Vycor reactor having a lower section 12 inches long and 30 mm. outside diameter and an upper section 8 inches long having an outside diameter of 38 mm. The catalyst was supported on a porous porcelain disk and a 100 mesh stainless steel screen. The screen and disk were drilled to accommodate a ¼ inch Vycor thermowell placed in the center of the reactor. The reactor was heated with an electric oven. The lower 12 inches of the reactor was the preheat zone and the upper 8 inch catalyst area heated separately was the reaction zone. The gaseous stream of reactants was admitted into the bottom of the reactor. The catalyst used contained 10 weight percent of a mixture of 75 percent molybdenum oxide and 25 percent bismuth oxide deposited on a support. The catalyst was prepared by dissolving 40.88 grams of

in 200 mls. of water and then adding thereto a solution of 23.13 grams of $Bi(NO_3)_3 \cdot 5H_2O$ dissolved in 100 mls. of water and 50 mls. of concentrated nitric acid. The solid that formed was redissolved by stirring into the solution 70 mls. of concentrated nitric acid. 400 grams of screened ground Alundum pellets having a mesh size greater than 40 and less than 100 were stirred into the solution which was then reduced to dryness on a hot plate with stirring. The porosity of the Alundum particles was 26 percent and the surface area of the catalyst was approximately 1 square meter per gram. The catalyst particles were heated at 350° C. to 400° C. under oxygen for 64 hours. 130 mls. of the catalyst was placed in the upper portion of the reactor tube. The reaction zone was heated to 420° C. and 5 mol percent butadiene, 7.5 mol percent oxygen and 87.5 mol percent steam were fed into the reactor under conditions to maintain a contact time of 2.6 seconds. The butadiene was converted to furan at a rate of 18.5 percent per pass and selectivity of 51.5 percent. When the temperature was raised to 450° C. and mol percent oxygen was reduced to 5, butadiene was converted to furan at a rate of 16.9 percent and a selectivity of 54 percent. When the example is repeated with isoprene instead of butadiene, good yields of methyl furan are obtained.

We claim:

1. A method for preparing furan which comprises reacting a diolefin containing 4 to 5 carbon atoms with oxygen and steam at a temperature above 400° C. at a diolefin pressure equivalent to less than one-half atmosphere at one atmosphere in the presence of a catalyst containing molybdenum and bismuth atoms in a ratio of one to 15 atoms of molybdenums to one atom of bismuth.

2. A method for preparing furan which comprises reacting butadiene with oxygen in a molar ratio of 0.5 to 2 mols of oxygen per mol of butadiene at a temperature from above 400° C. to 700° C. at a partial presssure of butadiene equivalent to less than 250 mm. of mercury absolute when the total pressure is one atmosphere in the presence of steam and a catalyst containing molybdenum oxide and bismuth oxide wherein the atomic ratio of molybdenum to bismuth is about 1 to 15 atoms of molybdenum to one atom of bismuth.

3. A method for preparing furan which comprises reacting butadiene at a temperature of about 450° C. to 550° C. with oxygen in a molar ratio of 0.5 to 2 mols of oxygen per mol of butadiene and two to 30 mols of steam per mol of butadiene in the presence of a catalyst comprising a mixture of bismuth oxide and molybdenum oxide, each present in an atomic ratio of 10 to 3 atoms of molybdenum per atom of bismuth, the particles of said catalyst having a surface area of less than 25 square meters per gram.

No references cited.

IRVING MARCUS, *Primary Examiner.*